March 27, 1928.
G. D. SUNDSTRAND
1,663,670
LATHE
Filed July 7, 1923
3 Sheets-Sheet 1
Fig. 1
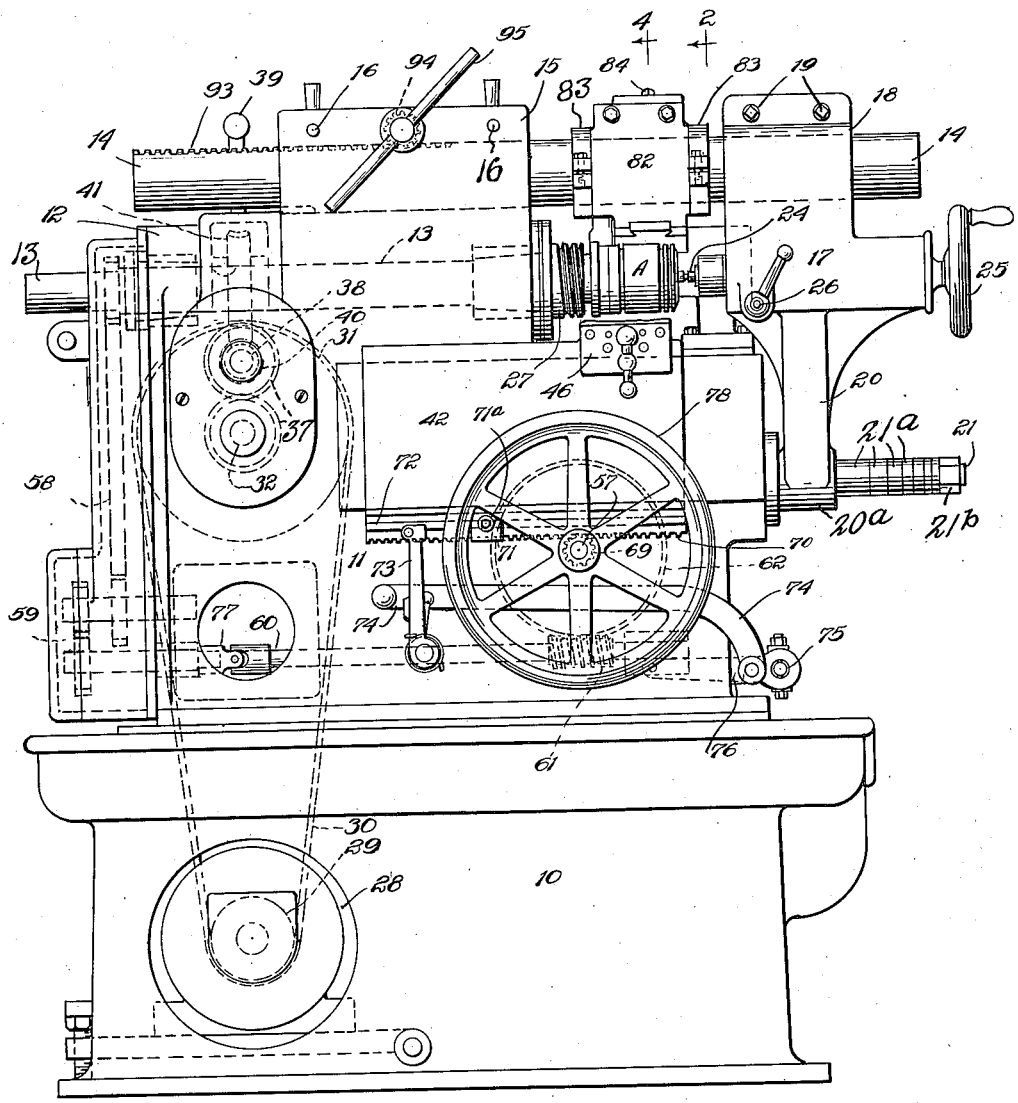
Fig. 1ª
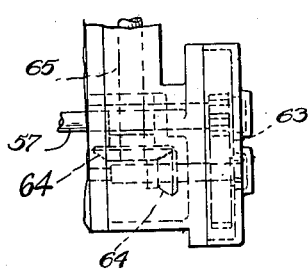
Inventor
G. D. Sundstrand
By Chindahl, Parker & Carlson
Attys

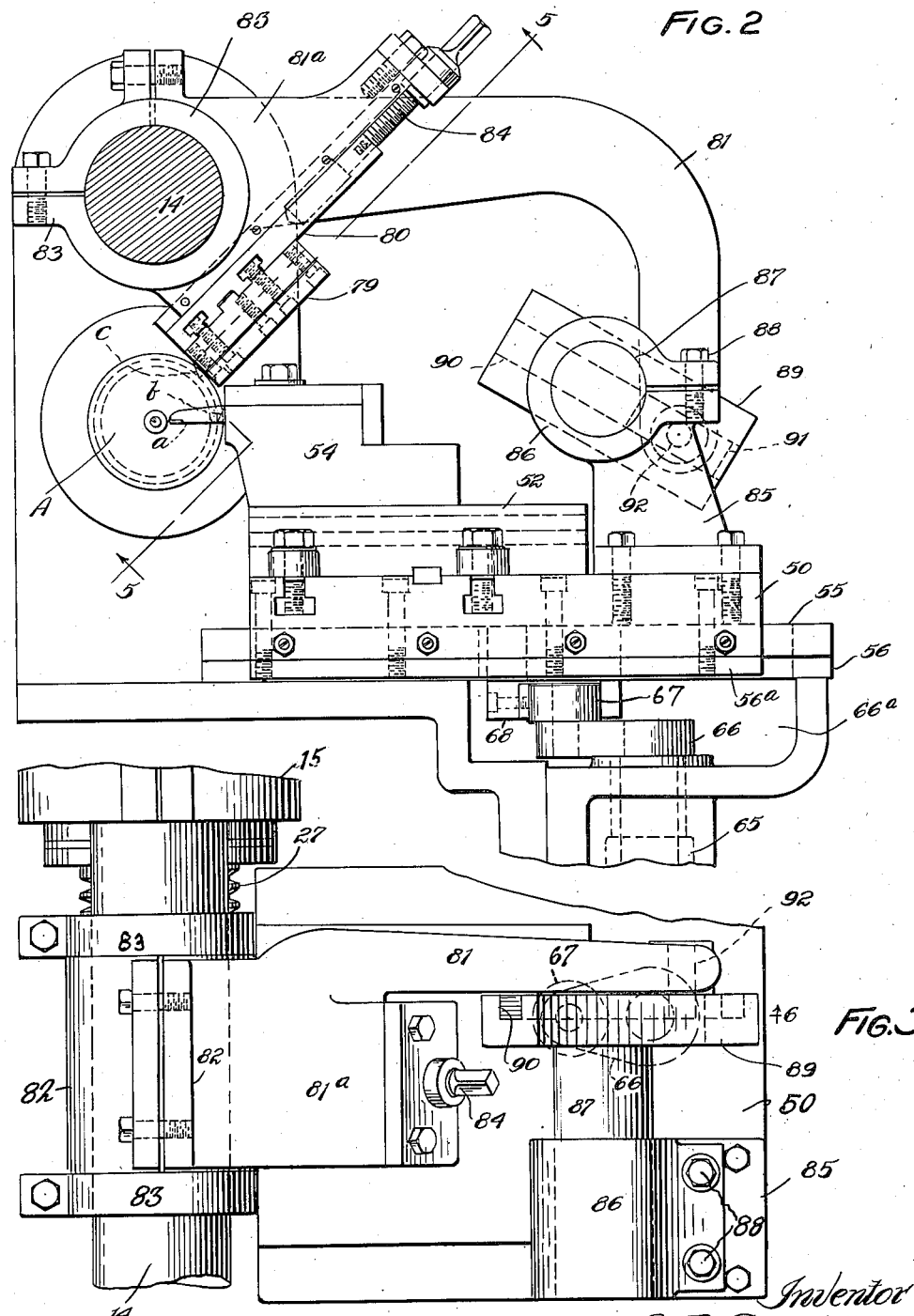

March 27, 1928.

G. D. SUNDSTRAND

LATHE

Filed July 7, 1923

1,663,670

3 Sheets-Sheet 3

Inventor
G. D. Sundstrand
By Shindahl, Parker & Carlson.
Attys

Patented Mar. 27, 1928.

1,663,670

UNITED STATES PATENT OFFICE.

GUSTAF DAVID SUNDSTRAND, OF ROCKFORD, ILLINOIS, ASSIGNOR TO SUNDSTRAND MACHINE TOOL CO., OF ROCKFORD, ILLINOIS, A CORPORATION OF ILLINOIS.

LATHE.

Application filed July 7, 1923. Serial No. 650,173.

The invention has general reference to lathes and especially relates to the feeding of the cutting tool or tools to the work.

A general object of the invention is to provide a tool feeding means wherein a plurality of cutting tools may be simultaneously moved into operative engagement with the work but at different speeds and by a single actuating medium.

A more specific object of the invention is to produce a novel method of effectually supporting a cutting tool located above and in spaced relation to the lathe bed, so as not to interfere with other tools mounted on the bed.

Another object is to provide a feeding means for such a tool susceptible of a very sensitive adjustment for varying the rate and extent of travel of the tool.

The objects of the invention thus generally stated, together with other and ancillary advantages, may be attained by the construction and arrangement illustrated in the accompanying drawings forming part hereof, but it is contemplated that other and equivalent means may be devised by those skilled in the art without departing from the spirit and scope of the invention as expressed in the appended claims.

Figure 4:
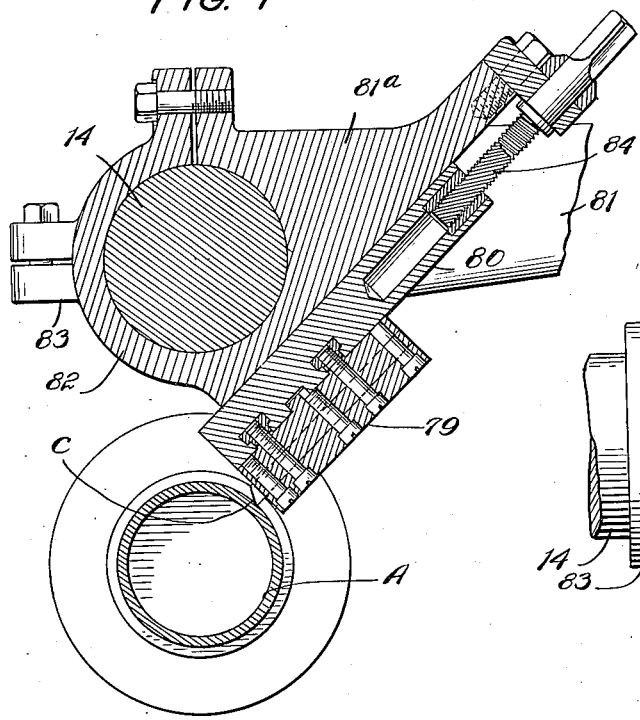
Figure 5:
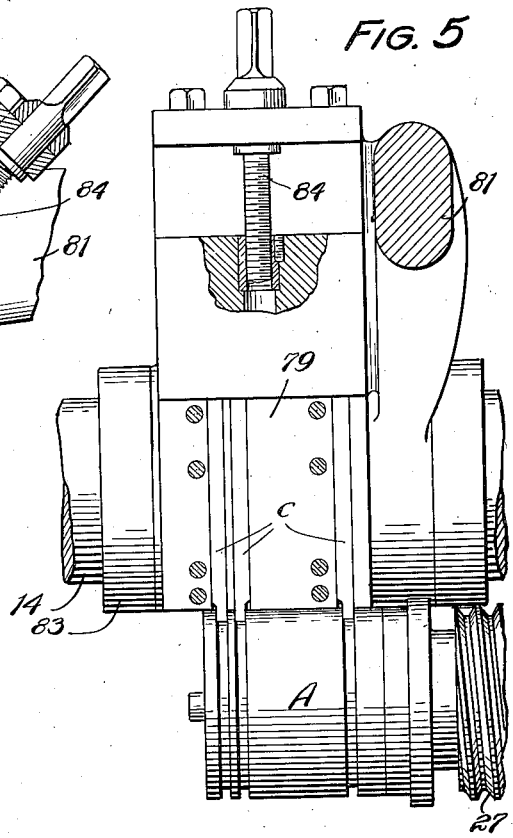
Figure 6:
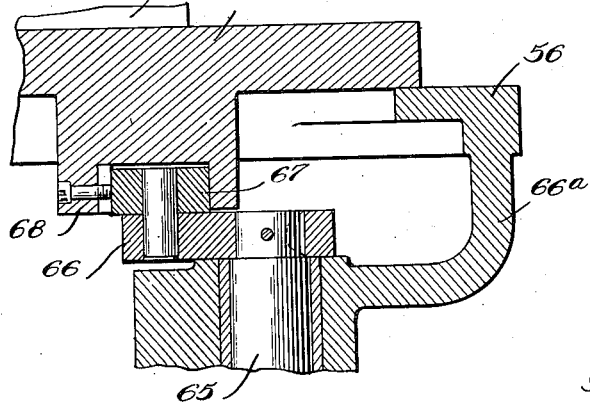
Figure 7:
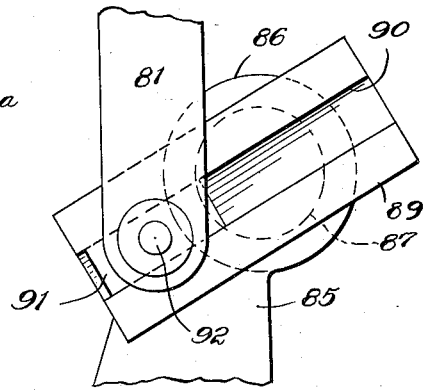

Figure 1 of the drawings is a front elevational view of a lathe embodying my invention. Fig. 1ª is an elevation illustrating the connection between the horizontal shaft 57 and the vertical shaft 65. Fig. 2 is a fragmentary vertical sectional view taken substantially in the plane of line 2 of Fig. 1. Fig. 3 is a fragmentary plan view of the parts shown in Fig. 2. Fig. 4 is a fragmentary vertical sectional view taken in the plane of line 4 of Fig. 1. Fig. 5 is a fragmentary sectional view taken in the plane of line 5—5 of Fig. 2. Fig. 6 is a fragmentary vertical sectional view taken in the plane of line 6 of Fig. 3. Fig. 7 is a fragmentary detail view illustrating the manner of mounting the rear end of the auxiliary tool-carrier arm, the view being taken looking in the direction opposite from that in which these parts are seen in Fig. 2.

The lathe selected for purposes of illustration is particularly adapted for use in the manufacture of parts requiring a substantial amount of machine work, such, for example, as pistons, pulleys, small flywheels, gear blanks, bushings and rings of various types, universal joint crosses, and similar small parts upon which a large number of operations must be performed. Herein, I have shown and will describe my invention as applied to the machining of pistons.

The lathe comprises a hollow base 10 upon which is supported a body 11 of substantial height at one end forming in effect a column and lower at its other end to form a bed. The upper portion of the column forms a stationary headstock 12 in which a work-supporting spindle 13 is journalled, and above the spindle is mounted a shaft 14 which extends longitudinally over the bed. This shaft is made of substantial size, forming a rigid overarm, and is securely clamped in the extreme upper end of the column by means of a split bearing 15 formed integral with the headstock and having clamping bolts 16.

At the opposite end of the bed I provide a tailstock 17 which is so mounted as to constitute a connection between the overarm and the lathe bed. Thus the tailstock has in its upper portion a split bearing 18 equipped with clamping bolts 19 whereby the tailstock may be rigidly clamped upon the overarm. Also the tailstock has a depending portion 20 the hub 20ª of which is adjustably mounted upon a stud 21 projecting outwardly from the bed. The stud 21 is of sufficient length to allow for any necessary adjustment of the tailstock. 21ª are spacer sleeves or collars which may be placed on the stud 21 at either or both sides of the hub 20ª of the tailstock. 21ᵇ is a nut on the outer end of the stud 21 for clamping said hub and the series of spacer sleeves against the end of the bed. This construction while providing an effectual support for the tailstock also provides a support for the free end of the overarm. The tailstock may be provided with a center 24 adjustable in the usual way by means of a hand wheel 25 and arranged to be locked by the clamping screw 26.

The spindle 13 may be provided with suitable means for holding the work A, herein shown as a piston. I have shown in the present instance for this purpose a chuck 27 of a well known character.

Enclosed within the base 10 is an electric motor 28 which I prefer to employ as the source of power. This motor is connected with the spindle 13 by means of a pulley 29, a belt 30, a pulley 31 mounted upon a shaft 32, and a pair of intermeshing gears 37. One of these gears is fastened upon the shaft 32 and the other is mounted upon a parallel shaft 38 which also carries a worm 40 meshing with a worm wheel 41 fast upon the spindle 13. A suitable shifting clutch (not herein shown) having an operating handle 39 (Fig. 1) may be interposed between the pulley 31 and its driving connection with the spindle.

Movable longitudinally of the lathe bed, in a direction parallel to the spindle, is a front tool carriage 42 mounted upon suitable ways 42$^a$ and having a saddle 46 mounted thereon for transverse movement. The saddle in turn may support a tool holder (not herein shown) adapted to carry tools which in the longitudinal movement of the carriage serve to turn the outer periphery of the work A.

Also mounted upon the lathe bed is a rear tool carriage 50 carrying a table 52 adjustable longitudinally of the bed and in turn supporting a tool holder 54 adjustable transversely of the bed. As shown in Fig. 2, the rear tool carriage 50 is mounted upon a plate 55 providing undercut ways 56 adapted to be engaged by gib-plates 56$^a$ upon the carriage.

The mechanism for moving the carriages 42 and 50 is actuated from a common drive means including a shaft 57 mounted transversely in the body 11 and operatively connected with the spindle 13 by means of a chain and sprocket connection 58, change speed gears 59, a shaft 60, a worm 61 and a worm wheel 62, the latter being fast upon the forward end of the shaft 57.

The means for moving the carriage 50 is actuated from the shaft 57 and comprises a pair of spur gears 63 (Fig. 1$^a$), one of which is fast on the shaft 57 and the other on a countershaft 57$^a$, bevel gears 64, and a vertical shaft 65 (Fig. 2). One of the bevel gears 64 is on the countershaft 57$^a$, the other being on the lower end of the shaft 65. On the upper end of the latter is fast a crank arm 66 carrying a roller 67 which engages with the carriage 50 through the medium of a depending portion 68 operating in a suitable aperture provided in the plate 55. The depending portion 68 is constructed to provide a groove extending longitudinally of the bed or parallel with the work spindle (Fig. 6). Beneath the plate 55 the body 11 is arranged to coact with the upper end of a housing for the shaft 65 and gears 63, 64, to provide a closed chamber 66$^a$ in which the crank arm 66 and its associated parts may operate. As shown in Fig. 2 the arrangement is such that in the initial forward movement of the rear tool carriage 50 by the operation of the crank arm 66, the rate of travel is relatively rapid as compared to the final movement when the crank arm approaches its foremost position (dotted lines Fig. 3). I take advantage of this variation in the rate of movement of the carriage by mounting in the tool holder 54 a facing tool $a$ (Fig. 2) for the closed end of the piston A which is so adjusted as to perform the major portion of its facing operation during the movement of the carriage at relatively high speed; and by also mounting in said tool holder a set of tools $b$ (Fig. 2) to perform operations requiring a slower rate of feeding movement, namely, the cutting of the grooves in the periphery of the piston. In the present instance the tools $b$ are merely roughing tools.

The front carriage 42 is also actuated from the shaft 57 through the medium of a pinion 69 and rack 70 (Fig. 1), the former being fast upon the shaft 57 and the latter rigid with the lower edge of the carriage. A block 71 is mounted for longitudinal adjustment at the lower edge of the carriage 42 in a groove 72 and has a forwardly projecting pin 71$^a$ arranged to engage with a means for stopping the feeding operation at a predetermined point in the travel of the carriage. This means comprises a latch member 73 normally supporting the free end of a lever 74 pivoted at 75 and having rigid therewith an arm 76 which pivotally supports a bearing for the free end of the shaft 60 upon which the worm 61 is mounted. In said shaft is interposed a universal coupling 77 which, when the latch member 73 is engaged by the pin 71$^a$ to release the lever 74, permits the worm 61 to disengage from the worm wheel 62.

It will be apparent that since the rear tool carriage is driven from the shaft 57 as is also the front tool carriage, when this tripping operation takes place, the entire feeding mechanism is brought to a stop. To restore the parts to their initial position the shaft 57 may be rotated through the medium of a hand wheel 78.

Associated with the rear tool carriage so as to be actuated thereby is an auxiliary feeding means whereby one or more tools $c$ (Figs. 2, 4 and 5), herein finishing tools, may be moved into engagement with the work at a variable speed. Said tools $c$ are mounted in a suitable tool holder 79 which in turn is mounted for adjustment longitudinally of the bed upon the under rear side of a slide 80 suspended from the overarm 14 at a point immediately adjacent the lower rear side thereof. In the present instance the slide 80 is also mounted for adjustment upon the under rear side of a head 81$^a$ on the forward end of an arm 81. Said head includes a split bearing 82 for receiving the overarm 14 and is held against longitudinal movement on the overarm by a pair of clamping collars 83 (Fig. 1).

To provide for the adjustment of the slide 80, the head 81ᵃ carries an adjusting screw 84 having a threaded engagement with the slide 80.

It will be observed that the tool holder 79 is thus mounted eccentrically with respect to the axis of the overarm 14 which provides a pivotal support for the arm 81. Hence, in the swinging movements of the arm 81, the tools $c$ will be moved toward and away from the work A positioned directly below the overarm. The means for imparting a swinging movement to the arm 81 will now be described.

Rigidly mounted upon the rear tool carriage 50 at the rear end thereof is an upstanding bracket 85 having a split head 86 adapted to receive a stud shaft 87 and provided with clamping screws 88 whereby to hold the shaft in any desired position of adjustment. Said shaft 87 carries at its free end an elongated block 89 provided with a longitudinally extending groove 90 in its face opposite the head 86 (Fig. 7). Said groove forms a slideway for a shoe 91 carried by the free end of a stud shaft 92 journalled in the lower rear end of the arm 81, which latter extends first rearwardly from the overarm over the rear tool carriage and then downwardly for connection with the rear end of the carriage in the manner just described.

It will be apparent that the block 89 is capable of adjustment to position its groove 90 at any desired angle, and since the forward end of the arm 81 is mounted to swing upon the overarm 14, the rear end of the arm will in the transverse movements of the rear tool carriage 50 rise and fall to an extent depending upon the angle of inclination of the groove 90. As a result, the tools $c$ in the tool holder 79 at the forward end of the arm 81 are caused to move into and out of engagement with the work A. Obviously the rate of feeding movement of the tool $c$ may be varied by varying the angular position of the block 89 and its groove 90, as may also the range or extent of movement. As above indicated, the tools $c$ are, in the present instance, adjusted so as to make the finishing cuts in the formation of the peripheral grooves formed by the roughing tools $b$, wherefore the arrangement is such that the tools $b$ have partially completed the formation of the grooves before the tools $c$ commence their cutting operation.

As a means for adjusting the tailstock 18, and as a further provision for adjusting the tools $c$ longitudinally of the work, the overarm 14 is adjustable in the headstock 15 through the medium of rack teeth 93 formed upon the upper side of the overarm and a pinion 94 mounted in the headstock and operable by a cross bar 95 rigid therewith. To permit of such longitudinal adjustment of the arm 81 the stud shaft 87 may be adjusted longitudinally in the split head 86 of the upstanding bracket 85.

It will be seen that I have provided a lathe which is equipped to perform a plurality of operations simultaneously or substantially so, with utmost efficiency.

The use of the directly operating rear tool or crank feed, in combination with the indirect or auxiliary feed, renders it possible to perform at relatively high speed a simple facing operation; at a lower speed, the more difficult operation of forming the peripheral grooves in the work; and at a still lower speed, the operation of finishing the grooves. At the same time, the operation of turning the outer periphery of the work is performed at still another speed by the operation of the front tool carriage.

An important advantage in the overarm construction employed resides in the provision of a support for the tailstock which obviates the necessity of providing a lathe bed substantially larger than that now employed. Also, I have utilized the overarm to substantial advantage in providing a means for supporting a tool holder for movement transversely of the axis of the work spindle independently of the lathe bed, leaving the latter for use in supporting the rear tool carriage.

The general construction of the lathe herein illustrated is claimed in my application Serial No. 591,038, filed September 27, 1922.

I claim as my invention:

1. A lathe having an overarm, a tool-supporting arm mounted upon the overarm, and means for swinging the arm to move the tool carrier including a block having an inclined groove, and a shoe slidable in said groove.

2. A lathe having an overarm, a tool-supporting arm mounted upon the overarm, and means for swinging the arm to move the tool carrier including a block having a groove extending longitudinally thereof, a shoe slidable in said groove, and means for adjustably supporting said block.

3. A lathe having an overarm, a tool-supporting member mounted upon the overarm, means for swinging said member to move the tool carrier including a block having a groove, a shoe slidable in said groove, and adjustable means for varying the angle of inclination of said groove.

4. A lathe having a tool-carrying arm mounted for pivotal movement, and means for swinging the arm to impart a feeding movement to the tool, said means comprising a part mounted for reciprocatory movement, a block having a groove therein, a supporting stud adjustably supported in said part, and a shoe having a stud journaled in said arm and sliding in said groove.

5. In a lathe, the combination with a support for the work, a tool carrier, a pivotal support for the tool carrier having means for adjusting the tool carrier radially of the work, means for swinging said pivotal support including a member having an inclined guideway, a second member operable in said guideway, and a reciprocatory support for one of said members.

6. A lathe having means for supporting the work, a tool carriage mounted for reciprocation transversely of the work, a pivotal support above the work, a tool-carrying arm mounted on said support, a tool holder on said carriage, means for reciprocating said carriage including a shaft having a crank arm thereon operatively connected with said carriage to move it first at a relatively high speed and then at a relatively low speed, and means operable in the movement of said carriage to move the second tool carrier into engagement with the work at a still slower speed.

7. A machine having, in combination a bed, a headstock, a tailstock, means carried by said stocks for rotatably supporting a piston, a front tool carriage movable on the bed longitudinally of the axis of the piston for turning the periphery of the piston, a rear tool carriage on the bed movable transversely of the piston and having a tool to face the closed end of the piston and tools to form piston-ring grooves in said piston, an overarm supported by said headstock and tailstock, a part mounted on said overarm carrying a plurality of tools for finishing said grooves, and means actuated by the rear tool carriage for moving said part to advance and retract said finishing tools.

8. A machine having, in combination, a bed, a headstock, a tailstock, means carried by said stocks for rotatably supporting the work; a front tool carriage movable on the bed longitudinally of the axis of the work for turning the periphery of the work; a rear tool carriage on the bed movable transversely of the work and having a tool to operate upon the work; an overarm supported by said headstock and tailstock, a part mounted on said overarm carrying a tool for finishing the work of the last mentioned tool; and means actuated by the rear tool carriage for moving said part to advance and retract said finishing tool.

9. A lathe having, in combination, means for rotatably supporting the work, a tool carriage movable transversely of the work having a tool to face the end of the work and roughing tools to cut on the periphery of the work, a tool support carrying finishing tools to finish said roughing cut, and means actuated by said carriage for moving said tool support to move the finishing tools into and out of engagement with the work, said means being adjustable to vary the rate of feed of the finishing tools with respect to said carriage.

10. A lathe having, in combination, a bed, a headstock, an overarm, means for rotatably supporting the work, a rear tool carriage on the bed movable transversely of the work and carrying a roughing tool, a tool carrier mounted on said overarm carrying a finishing tool movable transversely of the work to finish the cut of the roughing tool, means on said rear tool carriage to actuate said carrier, said means including means to vary the feed of the finishing tool with respect to the rear tool carriage.

11. A lathe having, in combination, means for rotatably supporting the work, a first tool support carrying the roughing tool movable toward and from the work, a second tool support actuated by said first tool support and carrying a finishing tool toward and from the work simultaneously with the roughing tool, said finishing tool being moved at a higher rate of speed than the roughing tool whereby to overtake the roughing tool to finish the cut made by the roughing tool.

In testimony whereof, I have hereunto affixed my signature.

GUSTAF DAVID SUNDSTRAND.